Figure 1:
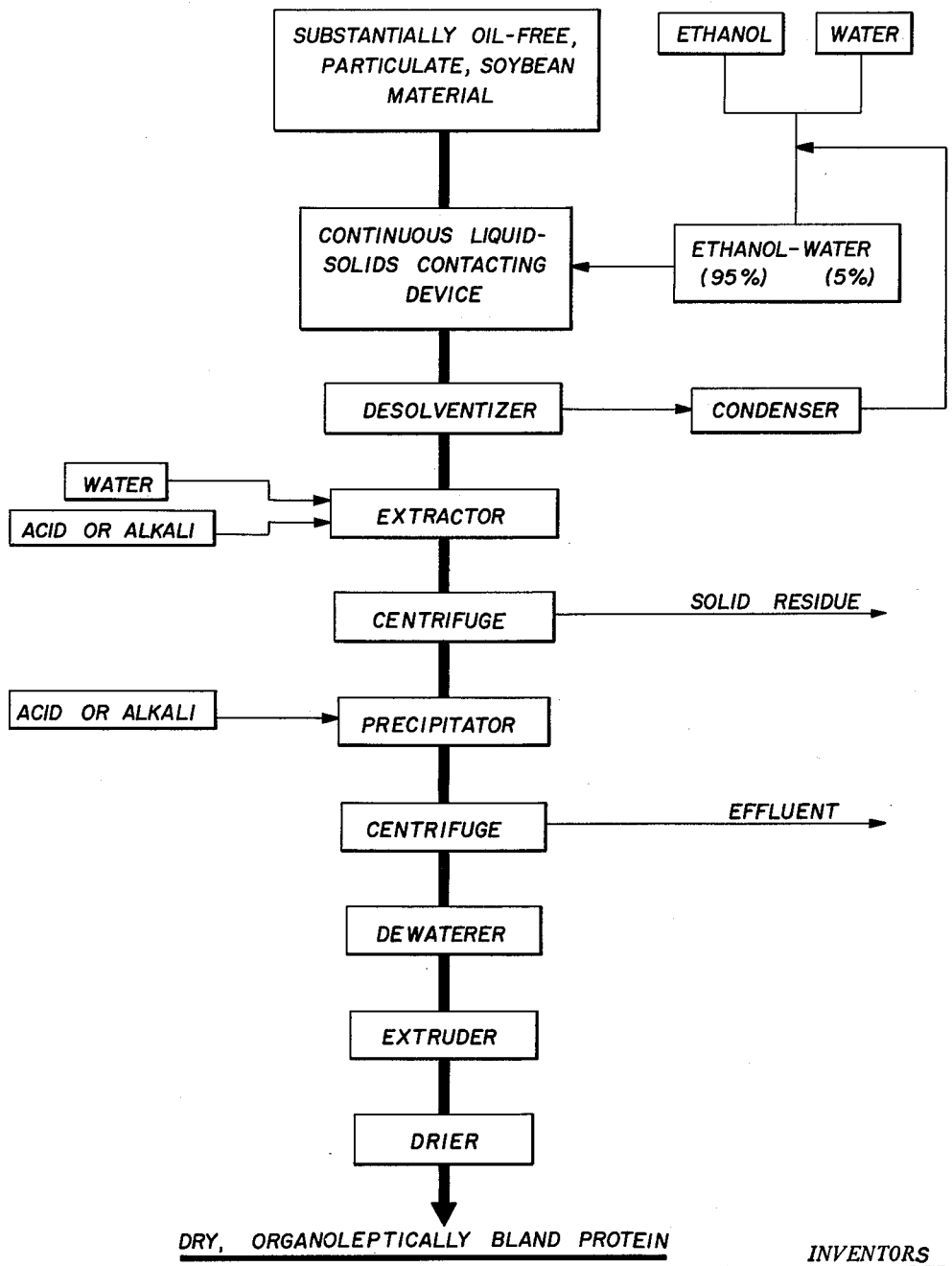

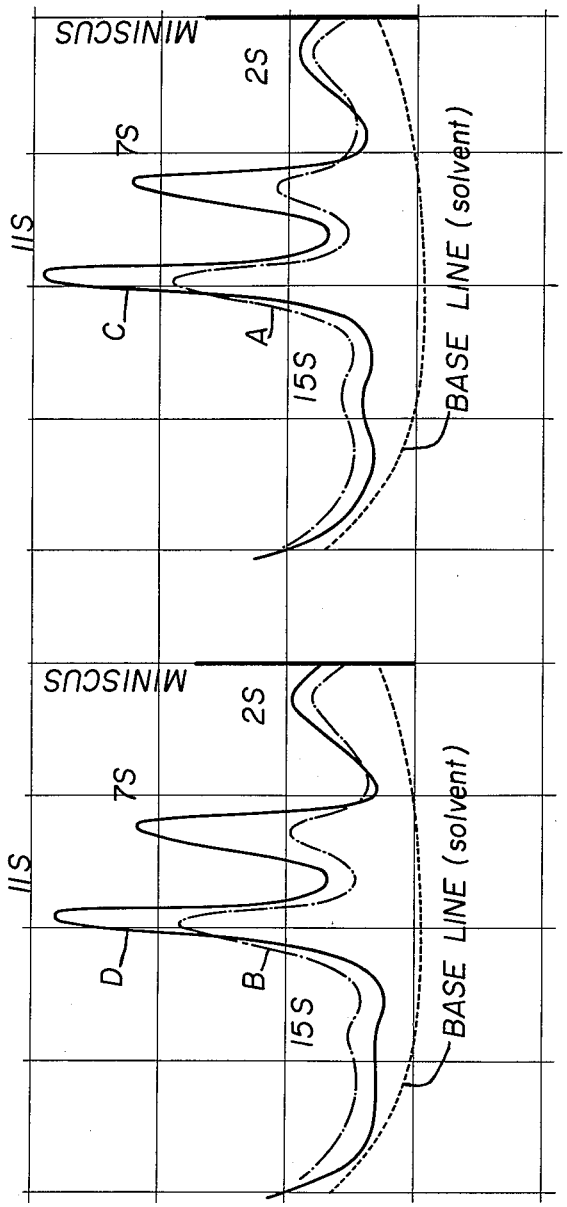

United States Patent Office 3,043,826
Patented July 10, 1962

3,043,826
METHOD FOR PRODUCING ORGANOLEPTICALLY BLAND PROTEIN
Nathaniel J. Beaber, Kansas City, Mo., and James H. Obey, Pittsburgh, Pa., assignors to J. R. Short Milling Company, Chicago, Ill., a corporation of Illinois
Filed Jan. 20, 1959, Ser. No. 787,941
1 Claim. (Cl. 260—123.5)

The present invention relates to the recovery of isolated protein products from soybeans, and to the products so recovered.

It has long been proposed to recover protein from soybeans by first de-oiling the beans, then extracting the protein from the de-oiled soybean material by means of an aqueous medium at a pH substantially different from the isoelectric point of the protein, recovering the protein by precipitation at its isoelectric point, and drying the precipitated protein. While the oil removal can be accomplished by a pressing operation, solvent extraction of the oil has proved more effective and it is now the common commercial practice to extract the oil by means of hexane.

While the isolated protein product recovered by such a procedure has attained considerable commercial acceptance for some industrial purposes, it has never been widely accepted for food applications in the United States. The primary reason for this is that the protein products recovered from commercially produced, hexane-extracted flakes have a distinct, bitter, "beany" taste which is highly undesirable in any food product other than those, such as certain types of candies, which are of such nature that the bitter taste can be masked. Another reason for lack of acceptance of isolated soybean protein products for certain food applications is the fact that the protein product should produce a thermally irreversible gel, and many isolated soybean protein products have not possessed this capability. To overcome these disadvantages, it has been proposed to substitute ethanol for the hexane used in oil extraction, or to supplement the hexane extraction with a second extraction by ethanol, in order to remove certain non-oil solubles thought to be responsible for the bitter taste and the failure to form a gel.

The use of an alcohol solvent appears to have found its first major success in Satow's work, at the "Central Laboratory" in Manchuria, where ethanol was used at elevated temperatures and pressures to extract the oil. The Manchurian work appears to have been directed primarily to oil recovery, with no particular attention given to the protein which could be recovered. In more recent times, the ethanol extraction processes have been investigated in the United States with a view to obtaining proteinaceous products which would be acceptable to the food industry. Thus, Beckel et al. in U.S. Patent 2,445,931 propose to extract the oil from soybean material by using ethanol at elevated temperatures and pressures, so removing not only the oil but also all of the non-oil solubles which can be taken up by alcohol. Similarly, in U.S. Patent 2,635,094, the same workers propose to subject to an alcohol extraction soybean material from which the oil has already been removed by means of hexane, the supplementary extraction with alcohol serving to remove unidentified components thought to be responsible for bitter flavor and non-gelability of the protein. Along lines already suggested by the Manchurian investigations, Rauer, in U.S. Patent 2,278,670, proposes the use of a mixture of a solvent such as hexane and a solvent such as methanol, the hexane extracting the oil and the alcohol extracting other components, so that a high purity protein might be obtained.

While alcohol extraction procedures, and particularly the methods proposed by Smith et al., have apparently succeeded in eliminating the bitter taste from soybean material, and have also produced proteinaceous extracts which, on drying without isolation of the protein, form thermally irreversible gels, such procedures have not been adopted commercially. One reason for this has apparently been the practical difficulties involved in the alcohol extraction procedure. If alcohol is employed to extract the oil, as well as the non-oil solubles, and so replaces the usual hexane extraction, it is either necessary to operate at temperatures so high as to denature the protein, or to accept the relatively poor solvent power of alcohol for oil at non-denaturing temperatures. Further, even when alcohol is employed primarily to remove the non-oil solubles, considerable expense and difficulty is involved in handling the solvent in a closed system including a cooling step to separate out the extracted solubles.

The present invention is based on the discovery that highly desirable protein products can be recovered from soybean material if (1) de-oiled soybean material (which contains alcohol-soluble, non-oil solubles) is treated, before recovering the protein, with a lower aliphatic alcohol at a temperature below about 58° C. and under such conditions that the alcohol does not remove any substantial amount of solubles from the soybean material, (2) the protein is then extracted from the alcohol-treated soybean material by an aqueous medium at a pH substantially different from pH 4.8–5.2, (3) the protein is then precipitated from the aqueous extract at a pH of 4.8–5.2, and (4) the resulting protein curd is then recovered and dried at a temperature not exceeding about 58° C.

This procedure differs from prior-art processes in that no attempt is made to remove, before recovery of the protein, the alcohol-soluble components heretofore described, by those skilled in soybean protein recovery, as (1) responsible for the bitter or "beany" taste and (2) responsible for inhibiting gelation of the recovered protein. Yet, the protein products obtained by the present invention are both completely bland in taste and capable of forming thermally irreversible gels. Surprisingly, other advantages result from the present process. Thus, the protein curd precipitated at pH 4.8–5.2 has a high solids content, in excess of 40% when extraction is carried out at a pH not exceeding 10.5, and often more than 50% when extraction is at a lower pH. The protein curd is glutenous in nature; it tends to exude water. Such curd can be extruded preparatory to the drying step, without the usual necessity for recycling dried product to make it extrudable. Finally, because of its high solids content, such curd can be dried much more quickly and under less severe conditions than the curds obtained by conventional procedures.

Further, the protein product of the present invention is substantially pure, despite the fact that the alcohol treatment does not remove from the soybean flakes or meal, the non-oil solubles which the prior-art workers have always thought to be responsible for adverse characteristics of soybean protein. Thus, while the converted Kjeldahl nitrogen values for soybean proteins of the prior-art run less than 100, using 6.25 as the conversion factor, protein products of the present invention give a converted nitrogen value of 102–105. Analyses of the protein products of the invention indicate that the dried product always is substantially pure protein, and that protein product comprises three major constituents, one having a molecular weight estimated by ultracentrifuge analyses as on the order of or greater than 300,000, a second as having a molecular weight on the order of or greater than 150,000 and a third as having a molecular weight of 20,000–80,000.

The process of the invention has certain obvious commercial advantages, in addition to the character of the protein recovered. The most important of these is the fact that, since the alcohol is not used to extract any component from the soybean material, it is not necessary to do more than effect contact between the soybean material and the alcohol. The steps of cooling and re-heating the alcohol, and of stripping the alcohol from the extracted material, are therefore entirely avoided. Further, the high solids content of the protein curd, and the glutenous nature of the curd, greatly simplifies the drying operation.

The precise reason for success of the invention is not understood. From the nature of the protein product recovered, it is obvious that the theories advanced in the prior-art that removal from the soybean material of components responsible for non-gelability and bitter taste, are at best only partially correct. Because vegetable proteins in general are difficult to analyze and identify, no precise reason can as yet be given for the fact that, in accordance with this invention, mere contact with a lower alkanol prior to extraction of the protein results in recovery of a product at a precipitation pH 4.8–5.2 which is bland in taste, while omission of the alcohol treatment results in recovery of a product which not only has a bitter taste but also is different in other respects. However, it seems most likely that contact with alcohol effects a physical redistribution of at least some of the non-oil solubles of the soybean material, or perhaps even a change in chemical nature of some component or components of the soybean material, which allows the desired protein product to be recovered by water extraction and precipitation in the particular pH range employed.

SOYBEAN MATERIALS TO WHICH INVENTION IS APPLICABLE

The invention is applicable to all soybean materials from which the oil has been removed to a level of 2.5% by weight or lower but which still contain non-oil solubles which are extractable with alcohol. Thus, the starting material may be soybean "press cake" from which the oil has been expressed at low temperature, or it may be the de-oiled material resulting after oil extraction with a hydrocarbon solvent such as benzene or hexane or any other non-alcoholic solvent. The protein content of the starting material must be substantially undenatured by heat. Thus, the starting material may be the oil-free material produced by the process of U.S. Patent 1,275,308 to Satow, or that produced by any conventional oil-extraction process using a hydrocarbon solvent at temperatures below 58° C.

It is essential that an intimate and thorough contact between the soybean material and alcohol be effected and, for this reason, the starting material should be a particular or disrupted soybean material such as soybean flakes, flour or meal.

THE ALCOHOL TREATMENT STEP

Soybean materials, as above defined, are contacted intimately with any monohydric aliphatic alcohol of the group consisting of methanol, ethanol, propanol and isopropanol. The time of contact is not critical, being as short as one minute or as long as several hours. The temperature of the soybean material during alcohol treatment must not exceed about 58° C., successful results having been obtained at temperatures as low as 0–5° C.

The alcohol treatment step is carried out in such manner that the alcohol does not remove alcohol-soluble components of the soybean material. Advantageously, this is accomplished by first using the alcohol to extract an initial quantity of soybean material until the alcohol becomes saturated, at the temperature to be employed, with the non-oil soybean solubles, this initial quantity of soybean material being discarded. The saturated alcohol is then used to contact fresh soybean material and, since the alcohol cannot take up any more of the solubles present in the soybean material, no extraction occurs. Alternatively, the alcohol may be contacted with the soybean material and then thermally removed therefrom, at a temperature below 58° C., so that, while some solvent action may occur, any dissolved material is left on the soybean material as the alcohol is driven off. Similarly, the alcohol may simply be left in contact with the soybean material, the alcohol-soybean material mixture being combined with the aqueous extracting medium as hereinafter explained.

Enough alcohol is used to thoroughly wet the soybean material. At the lower limit, as to alcohol, the alcohol-to-soybean material weight ratio can be 1:2. Under most operating conditions, it is desirable to employ an alcohol-to-soybean weight ratio on the order of 6:1, to allow ease of handling in a continuous procedure as hereinafter described. The upper limit as to alcohol is not critical, except for practical economic considerations, and the weight ratio may be as high as 20:1.

While it is not necessary, from the standpoint of operability, that the alcohol be removed from the soybean material, it is most advantageous to remove the alcohol and recycle the same for re-use. Since the soybean material will contain a material amount of water, varying as to whether a preliminary drying step is used or omitted, it is advantageous to include with the alcohol a proportion of water sufficient to prevent the alcohol from picking up water from the flakes. Thus, if the soybean material is dried to a moisture content of 4% by weight, the use of 95.0% alcohol will assure an equilibrium between the water contents of the soybean material and the alcohol. On the other hand, if the soybean material is used without a preliminary drying step, the moisture content of the soybean material will be 8–11%, and it is desirable then to use 10% water in the alcohol.

A superior method for carrying out the alcohol treatment is shown in FIG. 1. The soybean material, such as flakes which have been oil-extracted with hexane at a temperature below 58° C., to a moisture content of 4%, is delivered continuously to a continuous liquid-solids contacting device. A blend of 85% ethanol=5% water is combined with the flakes in the device at room temperature to provide an alcohol-to-flakes ratio of 6:1. Hold-up time in the mixer need be only sufficient to assure intimate and thorough contact between the flakes and the alcohol. The material is delivered from the contacting device to a desolventizer and the alcohol-water system there removed at 55° C. with a hold-up time of one hour. The alcohol-water system is condensed and re-cycled, make-up alcohol and water being added, if required, to compensate for losses because of liquid retained in the flakes. The alcohol-freed flakes are delivered for protein recovery as hereinafter described.

THE PROTEIN EXTRACTION STEP

The oil-extracted, alcohol-treated soybean material is combined with water amounting to at least several times the weight of the soybean material and extracted, with continual agitation for a period of at least about 30 minutes, at a pH substantially different from 4.8–5.2. Thus, the extraction may advantageously be on the alkaline side of the isoelectric point, at pH 6.0–11.0, with the pH being adjusted by addition of sodium hydroxide. On the other hand, the extraction may be at a pH of 2.0–4.0, with that pH obtained by addition of sulfur dioxide or a mineral acid.

As indicated in FIG. 1, the aqueous extract is then separated from the residue by centrifuging.

THE PROTEIN RECOVERY STEP

The aqueous extract so recovered is then adjusted to a pH in the range of 4.8–5.4 by addition of an acid, advantageously acetic acid, though sulfur dioxide, the mineral acids, trichloroacetic acid, lactic acid, butyric acid and others can be employed. A light-colored, glutenous curd precipitates promptly and, after a short settling period in the precipitator, is easily removed by centrifuging. If the soybean material was freed of alcohol at 50–58° C. prior to extraction of the protein, the curd recovered will have a solids content of 35–50% by weight or more.

The glutenous curd recovered is unlike the curd recovered from soybean material treated with hexane alone, in that it is glutenous in nature and exudes water. Thus, if the protein curd of this invention is merely allowed to stand at room temperature for 15–30 minutes, it will be observed that a substantial amount of water has separated from the curd.

REMOVING WATER AND DRYING

The water content of the curd is advantageously reduced by any mechanical procedure. Thus, the curd may be passed through squeezing rolls or opposed squeezing belts or subjected to a simple expressing treatment. The resulting curd is then extruded to subdivide the same, and is dried under conditions so controlled that the (dry bulb) temperature of the material does not exceed 58° C. The time of drying, and the type of drier employed, are not critical so long as the actual material temperature does not exceed the 58° C. limit. However, because of the high solids content of the recovered curd, and the fact that the curd can be mechanically freed from excess water, the drying period is always shorter, for a given drying temperature, than is the case in conventional procedures.

While conventional commercial methods for producing protein from soybean material have included the step of extruding the protein curd preparatory to drying, it has heretofore been necessary to recycle some of the dry final product to the curd prior to extrusion in order to avoid agglomeration of the extruded material and plugging of the extruder. Such recycling step is entirely avoided in the present invention because of the dough-like nature of the protein curd.

THE PROTEIN PRODUCT

The resulting protein product is a light-colored, substantially all soybean material having the two characteristics desirable for food applications, namely, bland taste and the ability to form a thermally irreversible gel.

Electrophoretic patterns for proteins obtained from alcohol-contacted soybean material in accordance with the invention are substantially the same as for proteins obtained from soybean materials which have been extracted with alcohol.

As seen in FIG. 2, ultracentrifuge curves for protein obtained in accordance with the invention from alcohol-contacted soybean material (curves B and D) are substantially the same as for proteins obtained from soybean materials which have been extracted with alcohol (curves A and C). Molecular weight determinations based on the ultracentrifuge curves indicate that the product comprises four major components, one (25) having a calculate molecular weight of 20–80,000, the second a molecular weight on the order of or greater than 150,000, the third on the order of or greater than 300,000, and the fourth at least 600,000.

At solids concentration of at least 6% to 8% in water at neutral pH, the protein product of the present invention forms firm, thermally irreversible gels at 65–92° C.

The protein products of the invention have the ability to form dispersions up to 40–50% solids in aqueous medium, without heat, in the presence of bases or neutral salts. At a pH of 5.5, using ammonia or borax, dispersions up to 20% solids are obtained. With a pH of 5.8, using 10% borax, dispersions of 40% solids are obtained. On the acid side, with pH adjusted to 2.5 by means of sulphur dioxide, aqueous dispersions of 20% solids are obtainable with the protein products produced by the invention.

ILLUSTRATIVE EXAMPLES

Example 1

The starting material was 400 pounds of commercially prepared hexane-extracted soybean flakes having an oil content of less than 1% by weight and a moisture content of 4%, the hexane extraction having been carried out at temperatures below 58° C. The hexane-extracted flakes were delivered to a continuous-screw type, counter-current extraction apparatus operating with a hold-up time of 35 minutes. One hundred ninety proof ethanol was continually circulated through the apparatus at 22° C., counter-current to the flakes, the liquid treating medium having been previously contacted with similar soybean flakes until saturated with non-oil soybean solubles. The ratio of liquid to flakes by weight was 6:1.

The treatment was carried out in accordance with the flow sheet of FIG. 1. The drained flakes from the extractor were delivered to a desolventizer, the remaining liquid being removed thermally from the flakes by a desolventizer temperature of 55° C., the hold-up time in the desolventizer being 55 minutes.

The full amount of treated flakes was delivered from the desolventizer to a mixer with a slow speed rotary agitator and there extracted with 1330 gallons of water, adjusted to pH 7.2 with 30% NaOH, at 22° C., the extraction period being 75 minutes. The aqueous extract was recovered by centrifuging. By means of 8:1 acetic acid, the pH of the extract was then adjusted to 5.0. A light-colored curd precipitated promptly and, after a 30-minute settling period, the curd, totalling 222 pounds, was recovered by centrifuging. The solids content of the curd was 43.2%.

The curd was then extruded through a meat grinder, without addition of dried material, and dried in a Roto-louvre dryer. The air entry temperature in the dryer was 60° C. The wet bulb temperature was held below 43° C. The dried product was ground in an attrition mill and classified to +30 mesh. The total yield of protein amounted to approximately 24% of the weight of the starting material.

A 10% water suspension of a portion of the product was made at pH 4.9 with the addition of 2.5 grams ammonium hydroxide (28% NH₃). After 2 hours, the dispersion formed a thermally irreversible gel at 89° C. and, after 24 hours, at 91° C.

The dried product was a tan, friable material completely bland in taste.

Example 2

To demonstrate operability at low temperature of alcohol treatment, the procedure of Example 1 was repeated on a laboratory scale, as follows: 150 grams of the same hexane-extracted soybean flakes used in Example 1 were combined with 150 cc. of ethanol at 5° C. and mixed for one minute to assure intimate contact. Without removal of the alcohol, the alcohol-flakes mixture was combined with 2850 cc. water at room temperature. The pH was then adjusted to 7.0 by addition of 30% NaOH, and the mixture was agitated in a propeller mixer for 75 minutes to assure complete extraction.

The mixture was then centrifuged and the aqueous extract recovered. By addition of 8:1 acetic acid, the pH of the extract was adjusted to 5.2 and the curd allowed to settle for 30 minutes. The curd was then recovered by centrifuging and was found to be a light-colored, glutenous mass containing approximately 39% solids. The curd was tray-dried at 55° C. and amounted to 25% of the starting material. The dried protein was completely bland in taste. Gel temperature, determined by the procedure of Example 1, was 90° C.

*Example 3*

The procedure of Example 2 was repeated, using isopropanol in place of ethanol. The precipitated curd contained about 38% solids. A 15% dispersion of the protein in water was prepared in accordance with the procedure of Example 1 and was found to gel at 92° C., the gel being firm and thermally irreversible. The protein was completely bland.

*Example 4*

The procedure of Example 2 was repeated, using methanol. The precipitated curd contained about 40% solids. A 15% dispersion of the resulting bland protein in water was prepared in accordance with the procedure of Example 1 and was found to form a firm, thermally irreversible gel at about 90° C.

*Example 5*

The procedure of Example 2 was repeated, using sulful dioxide as the precipitant, in place of acetic acid, with a precipitation pH of 4.9. The resulting curd, containing about 46% solids, was somewhat lighter in color than obtained with acetic acid. Tray-dried at 55° C. for 16 hours, the final protein was completely bland in taste. A 15% dispersion of the product was made as in Example 1, and it was found that the dispersion formed a thermally irreversible gel at 92° C., the gel appearing slightly softer than that obtained for protein products precipitated with acetic acid.

*Example 6*

The procedure of Example 1 was repeated, using 400 pounds of the same hexane-extracted flakes. The alcoholic treating agent was 195-proof ethanol circulated through the extractor, counter-current to the flakes, at 55° C. The alcohol-to-flake ratio was 6:1. The hold-up time in the extractor was 55 minutes. The desolventizer temperature was 55° C. and the hold-up time there was 55 minutes.

The treated flakes were extracted for 30 minutes at 22° C. with 1265 gallons of water adjusted to pH 7.3 by addition of NaOH. The extract was recovered by centifuging and the residue discarded. The extract was adjusted to pH 5.1 by means of acetic acid. The resulting curd was allowed to settle for 30 minutes and then recovered by centrifuging. The amount of curd obtained was 207.5 pounds. The curd was dough-like in nature and exuded water on standing. An initial reduction of the water content of the curd was accomplished by squeezing the curd in cloth bags, removing approximately 10% of the water. The curd was then extruded through a conventional meat grinder, without addition of dry material, and was dried in a Rotolouvre dryer in the same manner as in Example 1. The yield of dry protein product was 21.5% of the weight of the soybean flakes employed.

The dry protein product was a light amber, friable material completely bland in taste. A 10% dispersion was made in water at pH 5.0, 2.6 grams of ammonium hydroxide (28% $NH_3$) solution being added to bring the pH to 7.4. After 2 hours, this dispersion formed a firm, thermally irreversible gel at 84° C. and, after 24 hours, at 91° C.

*Example 7*

Using the same soybean flakes as in Example 1, 10 pounds of the flakes were slurried with 6 gallons of 195-proof ethanol at 22° C. for 35 minutes. The alcohol was then removed by air drying at room temperature. The alcohol-freed flakes were then extracted for 30 minutes at room temperature with 26.1 gallons of water adjusted to a pH of 7.3 by addition of NaOH, the extract being recovered by centrifuging.

The pH of the extract was adjusted to 5.1 by addition of 8:1 acetic acid. A light colored curd precipitated promptly and was allowed to settle for 30 minutes. By centrifuging, 7.75 pounds of curd having a solids content of 38.7% was recovered. The water content of the curd was reduced by squeezing and the curd then tray-dried at 55° C.

The dry product was a light amber, friable material completely bland in taste. Using the procedure of Example 1, the product was found to have a gel temperature of 86° C., 2 hours after preparing the 10% dispersion, and 85° C., 24 hours after preparing the dispersion.

The yield of dry protein product amounted to 30% of the soybean flakes employed.

*Example 8*

For purposes of product comparison, the procedure of Example 1 was carried out with alcohol employed in such manner as to extract and remove from the soybean material a major proportion of the non-oil solubles. The same soybean flakes described in Example 1 were employed, 400 pounds being fed to the extractor and there contacted with 195-proof ethanol at 55° C. and a solvent-to-flake ratio of 6:1. Extractor hold-up time was 55 minutes. The alcohol was continually re-cycled and, during recycling, was cooled to 8° C. to remove the dissolved non-oil solubles from the alcohol.

The drained flakes from the extractor were desolventized at 55° C. for 55 minutes and then extracted with 1170 gallons of water, adjusted by NaOH to a pH of 7.2, for 30 minutes. The extract was recovered by centrifuging and the pH then adjusted to 5.1 by means of 8.1 acetic acid. A light-colored curd precipitated rapidly and, after a 30-minute settling period, was recovered by centrifuging. The curd amounted to 165 pounds and had a solids content of 46.6%. The curd was dried as in Example 1.

The dry protein product, amounting to 19.3% of the weight of soybean flakes employed, was a light amber, friable material which was completely bland in taste. With a dispersion obtained as in Example 1, the material formed a firm thermally irreversible gel at 91° C., at times 2 hours and 24 hours, respectively, after preparation of the dispersion.

*Example 9*

The procedure of Example 2 was repeated, except that the precipitation pH was obtained by addition of hydrochloric acid. The dry protein product obtained was the same as in Example 2, being light amber in color and bland to taste. The material, by the procedure of Example 1, forms a thermally irreversible gel at 90° C.

What is claimed is:

A method for recovering an improved soybean protein product comprising slurrying a soybean material which is substantially oil-free but which contains a substantial proportion of the non-oil solubles of the soybean, the protein content of such soybean material being substantially non-heat-denatured, with an aliphatic monohydric alcohol of 1–3 carbon atoms which is substantially saturated with said non-oil solubles, at a temperature not exceeding about 58° C., separating the alcohol from the soybean material and recycling the alcohol and slurrying additional soybean material therewith, the recycled alcohol being maintained at a temperature above that at which said non-oil solubles are separated therefrom, extracting the resulting alcohol-treated flakes with an aqueous extraction medium at a pH substantially different from 4.8–5.2, separating the aqueous extract from the residue, adjusting the pH of the separated extract to 4.8–5.2 and thereby precipitating a protein curd of at least 35% solids content, recovering such curd, and drying the curd at a temperature not exceeding about 58° C. to recover a light-colored protein product which is bland in taste and capable of forming a thermally irreversible gel.

References Cited in the file of this patent

UNITED STATES PATENTS

| | | |
|---|---|---|
| 2,278,670 | Rauer | Apr. 7, 1942 |
| 2,445,931 | Beckel et al. | July 27, 1948 |
| 2,479,481 | Ebert et al. | Aug. 16, 1949 |
| 2,495,706 | De Voss et al. | Jan. 31, 1950 |
| 2,635,094 | Belter et al. | Apr. 14, 1953 |

OTHER REFERENCES

Belter et al.: Abstract of application Serial Number 138,528, published June 24, 1952, 659 O.G., page 1106.

UNITED STATES PATENT OFFICE
CERTIFICATE OF CORRECTION

Patent No. 3,043,826                          July 10, 1962

Nathaniel J. Beaber et al.

It is hereby certified that error appears in the above numbered patent requiring correction and that the said Letters Patent should read as corrected below.

Column 2, line 49, for "he" read -- the --; column 4, line 25, for "mate-" read -- material --; line 43, for "85% ethanol=5%" read -- 95% ethanol-5% --; column 7, lines 26 and 27, for "sulful" read -- sulfur --.

Signed and sealed this 6th day of November 1962.

(SEAL)
Attest:

ERNEST W. SWIDER                          DAVID L. LADD
Attesting Officer                            Commissioner of Patents